United States Patent [19]

Clouse et al.

[11] Patent Number: 5,160,653
[45] Date of Patent: Nov. 3, 1992

[54] ELECTROLYTIC CAPACITOR AND ELECTROLYTE THEREFOR

[75] Inventors: James A. Clouse, Glasgow; Brian J. Melody, Bowling Green, both of Ky.

[73] Assignee: Aerovox M, Inc., Glasgow, Ky.

[21] Appl. No.: 486,076

[22] Filed: Feb. 28, 1990

[51] Int. Cl.⁵ .............................. H01G 9/02
[52] U.S. Cl. .................... 252/62.2; 361/505
[58] Field of Search ........... 252/62.2; 361/505

[56] References Cited

U.S. PATENT DOCUMENTS

| | | | |
|---|---|---|---|
| 1,976,700 | 10/1934 | Lilienfeld | 252/62.2 |
| 2,036,669 | 4/1936 | Yngve | 175/315 |
| 2,152,465 | 3/1939 | Clark | 252/62.2 |
| 2,165,091 | 7/1939 | Clark | 175/315 |
| 2,168,156 | 8/1939 | Clark | 252/62.2 |
| 2,505,180 | 4/1950 | Georgien | 175/315 |
| 3,067,367 | 12/1962 | Ross | 317/230 |
| 3,302,071 | 1/1967 | Stahr | 317/230 |
| 3,351,823 | 11/1967 | Jenny | 252/62.2 |
| 3,487,270 | 12/1969 | Alwitt | 252/62.2 |
| 3,609,468 | 9/1971 | Kihara | 252/62.2 |
| 3,835,055 | 9/1974 | Chesnot | 252/62.2 |
| 4,117,531 | 9/1978 | Ross et al. | 252/62.2 |
| 4,373,176 | 2/1983 | Finkelstein | 252/62.2 |
| 4,399,489 | 8/1983 | Ross | 252/62.2 |
| 4,447,346 | 5/1984 | MacNamee et al. | 252/62.2 |
| 4,509,094 | 4/1985 | Finkelstein et al. | 252/62.2 |
| 4,670,175 | 6/1987 | Shinozaki | 252/62.2 |
| 4,734,821 | 3/1988 | Morimoto et al. | 252/62.2 |
| 4,762,630 | 8/1988 | Shinozaki | 252/62.2 |
| 4,786,429 | 11/1988 | Mori et al. | 252/62.2 |
| 4,812,951 | 3/1989 | Melody et al. | 252/62.2 |

Primary Examiner—Prince E. Willis
Assistant Examiner—Jerry D. Johnson
Attorney, Agent, or Firm—Willian Brinks Olds Hofer Gilson & Lione

[57] ABSTRACT

The present invention is directed to a liquid electrolyte for an electrolytic capacitor, as well as an electrolytic capacitor made therewith. The electrolyte includes a liquid solvent portion comprising one or more N-substituted pyrrolidones in the amount of at least 40% and water in the range of about 0.2 to about 8%. The electrolyte includes a solute portion comprising an amine salt and boric acid. The amine salt consists of a dicarboxylic acid and an amine. The dicarboxylic acid has 3 to 40 carbons and is present at a level of 0.1 to 4 moles per kilogram of solvent. The amine part is either a tertiary or secondary amine and is present at a level of about 0.2 to 4 moles of active amine nitrogen per mole of dicarboxylic acid. In addition to the above-described electrolyte, the electrolytic capacitor includes a pair of electrodes, at least one of which is composed of a film-forming metal.

24 Claims, 1 Drawing Sheet

ELECTROLYTIC CAPACITOR AND
ELECTROLYTE THEREFOR

BACKGROUND OF THE INVENTION

The present invention relates to electrolytic capacitors and the liquid electrolyte portion used in such capacitors.

For capacitors designed to operate at higher voltages (300 or more working volts), aluminum electrolytic capacitors have usually contained solutions of ethylene glycol with boric acid, ammonium borates and complexing agents for borates, such as mannitol. These electrolytes have the drawback of being thermally unstable. Particularly above 85° C., these electrolytes tend to degrade. The mixture of ethylene glycol and acid anions may promote esterification and the formation of reaction products such as borate esters and water. As the solution ages, increasing amounts of borate esters and water have been observed. Higher concentrations could accelerate the attack on the anodic oxide film and cathode foil during electrically idle periods.

In order to passivate or protect the anodic oxide and cathode surfaces from attack during electrically idle periods, chromate, phosphate and similar anions are frequently added to electrolytic capacitors. The addition of chromates is highly undesirable because of their toxicity.

Another problem noted in high-voltage, high-capacitance devices is that the anodic oxide forming function of glycol-based electrolytes appears to decrease markedly in the presence of even minute quantities of chloride. It has been postulated that high leakage current areas or flaw sites may catalyze oxidation of ethylene glycol to corrosive species such as glyoxal and low molecular weight organic acids. These reaction products may attack imperfectly anodized portions of the device, such as the positive tab/terminal and the edges and ends of the positive foil.

In order to counter these problems, alternate materials have been employed as the solvent portion of the electrolyte, including dimethyl formamide, dimethyl acetamide and other substituted alkyl amides. However, these solvents have the further disadvantages of toxicity and volatility, and their use is generally restricted to capacitors rated below 300 volts.

Another problem with aluminum electrolytic capacitors is the susceptibility to acid attack of imperfectly anodized portions of the device, such as the positive tab/terminal and edges of the positive foil.

Another problem with high-voltage capacitors is their relatively short life, which has been attributed to the higher voltage accelerating chemical breakdown. Chemical breakdown is also accelerated by heat.

Over the years, several different formulations have been proposed for use in high-voltage electrolytic capacitors. For example, U.S. Pat. No. 4,373,176 to Finkelstein et al. discloses an electrolyte containing a tertiary amine or a dipropylamine mono salt of dodecanedioic acid in a solvent mixture of ethylene glycol, N-methyl-2-pyrrolidone and water.

U.S. Pat. No. 4,399,489 to Ross discloses an electrolyte for use in capacitors which includes ethylene glycol and N-methyl pyrrolidone and a solute mixture of diisopropylammonium pentaborate and dimethylammonium or diisopropylammonium boro-dicatecholate.

U.S. Pat. No. 3,609,648 to Kihara et al. discloses a capacitor electrolytic solvent consisting of primarily ethylene glycol and a lesser amount of polyvinyl pyrrolidone.

U.S. Pat. No. 3,067,367 to Ross discloses the use in high-temperature spacer-less capacitors of a gel electrolyte which is comprised of polymers, such as polyvinyl pyridine, and plasticizers, such as ethylene glycol, which is present at a concentration of 5 to 70%.

What is needed is an electrolyte which is more resistant to thermal degradation and which does not attack the anodic oxide during electrification or cause degradation of device performance during periods of standing idle. The electrolyte system should also have a high sparking voltage. Capacitors containing such an electrolyte would exhibit a high degree of resistance to scintillation, corrosion and shorting of the electrodes.

SUMMARY OF THE INVENTION

The present invention is directed to a liquid electrolyte for an electrolytic capacitor, as well as an electrolytic capacitor made therewith. In addition to the electrolyte, the electrolytic capacitor includes a pair of electrodes, at least one of which is composed of a film-forming metal. The electrolyte includes a solvent portion comprising one or more N-substituted pyrrolidones in the amount of at least 40% by weight and water in the amount in the range of about 0.2 to about 8% of the liquid portion. Unless otherwise noted, all percentages in this specification and the appended claims are based on weight. The electrolyte also has a solute portion which includes an amine salt and boric acid. The amine salt is composed of acid and amine portions. The acid portion is a dicarboxylic acid with 3–40 carbons; it is present at a level of about 0.1 to 4 moles per kilogram of solvent. The amine portion is selected from the group consisting of tertiary amines and relatively nonreactive secondary amines. The amine portion is present at a level of about 0.2 to 4 moles of active amine nitrogen per mole of dicarboxylic acid. As used herein, the term "relatively nonreactive secondary amines" is intended to mean secondary amines which are resistant to amide formation in the solvents of this invention at up to about 125° C. Examples of such relatively nonreactive amines include but are not limited to di-isopropyl amine and di-tert-butyl amine. Boric acid is present in an amount sufficient to provide a molar ratio of uncomplexed borate ion to dicarboxylic acid of between about 0.1 and about 1.2. Other additives may be present at a concentration which does not exceed 10%.

In accordance with a preferred embodiment, the electrolyte includes about 30–80% N-substituted pyrrolidone monomers, about 8–12% polyvinyl pyrrolidone, about 2–3% water, dicarboxylic acid at a level of about 0.5 to 2 moles per kilogram solvent, tertiary or secondary amine at a level of about 0.2 to 2 moles of active amine nitrogen per mole of dicarboxylic acid, and enough boric acid to provide a molar ratio of uncomplexed borate ion to dicarboxylic acid of between about 0.15 and about 0.65.

Most preferably, the electrolyte includes about 60% N-methyl-2-pyrrolidone, about 10% poly vinyl pyrrolidone, about 2% deionized water, about 15% dodecanedioic acid, about 0.7% boric acid, 11.6% diethyl ethanol amine, and smaller amounts of tri-N-propyl amine and p-nitrobenzoic acid.

As will be shown in connection with the examples below, embodiments of the present invention provide important advantages. Initially, the solution effects high anodizing efficiency which minimizes gassing and corrosion. The electrolyte has exceptional chemical stability, even at 125° C. for extended periods of time. Because of the chemical stability, the anodizing efficiency remains high for extended periods. The electrolyte also offers the advantage of readily wetting capacitor papers. The electrolyte has the further advantage of low vapor pressure, which allows the use of an impregnation vacuum of less than 5 mm Hg residual pressure within the impregnation chamber. The use of such high-vacuum impregnation results in more thorough impregnation of capacitor cartridges, which in turn contributes to capacitor performance.

Numerous other features, objects and advantages of the invention will become apparent from the following detailed description when read in conjunction with the accompanying drawings.

DESCRIPTION OF THE PREFERRED EMBODIMENT

Figure 1:
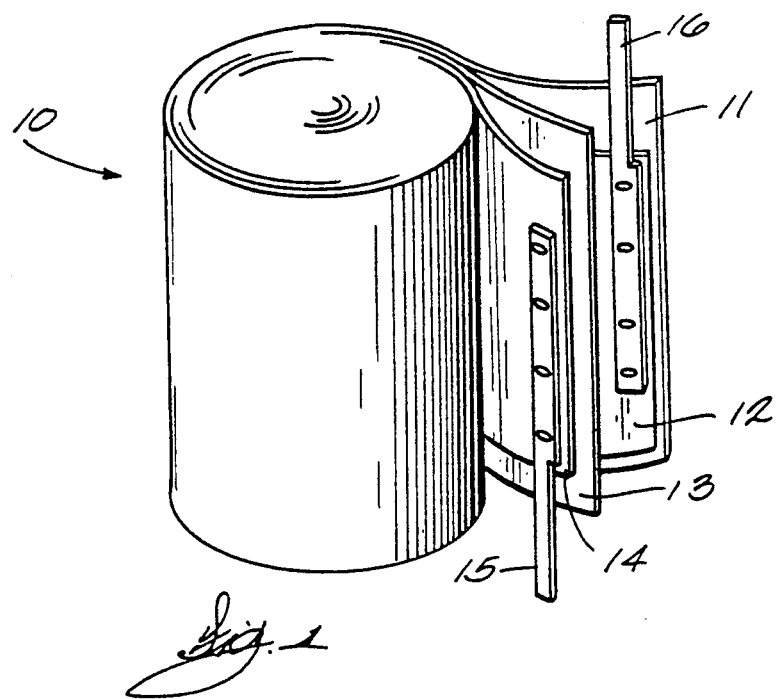
FIG. 1 is a perspective view of an exemplary partially unwound capacitor electrode body.

Referring now to FIG. 1, there is shown an electrolytic capacitor electrode body of the wound foil type denoted generally by reference numeral 10. Electrode body 10 comprises anode 12 of film-forming metal, such as aluminum and the like, having on its surface an oxide film which functions as the active dielectric for the capacitor. The dielectric oxide film is formed on anode 12 in accordance with the accepted anodization techniques. Cathode 14 may be comprised of either a film-forming metal or a relatively inert metal such as silver, depending upon the capacitor application and its requirements. Anode 12 and cathode 14 are separated by spacer strips 11 and 13 composed of paper or other porous material. Spacers 11 and 13 are impregnated with the electrolyte of the present invention. Electrodes 12 and 14 are provided with tabs 16 and 15, respectively, to serve as terminals for capacitor 10. Tabs 15 and 16 may extend from the same or opposite ends of the capacitor.

Figure 2:
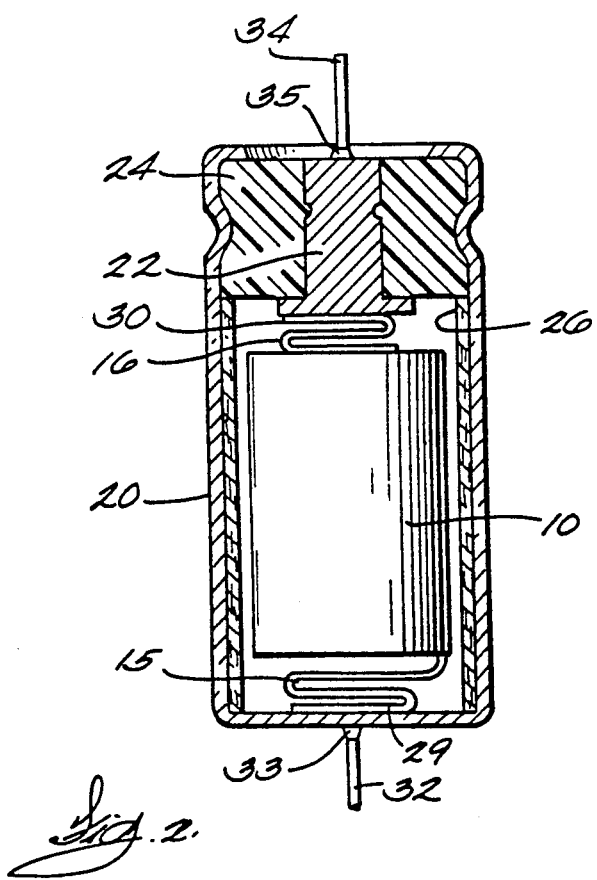
FIG. 2 is a cross section of an exemplary capacitor.

Turning to FIG. 2, the capacitor body 10 is placed in a housing 20, which preferably is an aluminum can. The housing 20 also contains a terminal insert 22, preferably made of metal, an insulating plug 24, preferably made of plastic, silicone rubber or other similar material. The cathode tab 15 is connected to the bottom of can 20 preferably by a weld 29, while the anode tab 16 is connected to the bottom of insert 22 preferably by a weld 30. External cathode lead 32 is connected to exterior bottom surface of can 20 preferably by a weld 33 and external anode lead 34 is connected to the top of insert 22 preferably by a weld 35. It is understood that the capacitor shown is exemplary and is not intended to be limiting as such capacitors can take on many forms depending on their specific applications.

The electrolyte of the present invention comprises a solvent portion which includes one or more N-substituted pyrrolidones in the amount of at least 40% by weight. Preferably, the N-substituted pyrrolidones are present at a level of at least 50%. More preferably, the N-substituted pyrrolidones are present at a level of at least 60%. Preferably, at least some of the pyrrolidone comprises polymer of substituted pyrrolidone. More preferably, the substituted-pyrrolidone polymer is polyvinyl-pyrrolidone. Preferably, N-substituted pyrrolidone is selected from the group consisting of N-methyl-2-pyrrolidone, N-ethyl-2-pyrrolidone, N-cyclohexyl-2-pyrrolidone, as well as combinations of two or more of the above. The most preferred pyrrolidone solvent is the combination of N-methyl-2-pyrrolidone (which is available from GAF under the tradename of M-Pyrol) and poly vinyl pyrrolidone K-30 (GAF Corp.).

In alternative embodiments, the polymer of substituted pyrrolidone is present at a level between about 5% and about 35% of the liquid electrolyte. More preferably, the polymer of substituted pyrrolidone is present at a level between about 8 and about 12% of the liquid electrolyte.

When the polymer of substituted pyrrolidone is present at a level of about 8–12%, N-methyl-2-pyrrolidone may be present at a level of about 60–70%.

When N-methyl-2-pyrrolidone is used alone, its preferred concentration is about 60% to about 80%.

The water is present in the range of about 0.2 to about 8%. More preferably, the water is deionized and present at a level between about 2 and about 3%.

The electrolyte of the present invention also includes a solute portion which includes an amine salt, including an acid and an amine portion. The acid portion comprises a dicarboxylic acid with 3 to 40 carbons. Preferably the dicarboxylic acid has 8 to 12 carbon atoms. Examples of suitable dicarboxylic acids include adipic acid; azelaic acid; dodecanedioic acid; sebacic acid; 5(6)-carboxy-4-hexyl-2-cyclohexene-1 octanoic acid (available from Westvaco under the trade name of Di Acid 1595); naphthalene dicarboxylic acid; and 4,4'-oxybis (benzoic acid) (available from Amoco under the trade name 4,4'-OBBA). Except as individually specified, the preceding dicarboxylic acids are available from DuPont, Union Camp, and Henkel, Inc.

Suitable dicarboxylic acids also may be obtained by dimerization of unsaturated 18-carbon acids in "tall oil" (available from Humko Div., Witco Corp., and other manufacturers). The acid portion may be composed of mixtures of the named compounds.

The dicarboxylic acid is present at a level of approximately 0.1 to 4 moles per kilogram of solvent. Preferably, the dicarboxylic acid is present at a level of approximately 0.5 to 2 moles per kilogram of solvent. More preferably, the dicarboxylic acid is present at a level of approximately 1 mole of dicarboxylic acid per kilogram of electrolyte solvent.

The amine portion of the amine salt solute includes tertiary amines and relatively nonreactive secondary amines. As noted above the term relatively nonreactive amine refers to secondary amines which are resistant to amide formation in the solvents of this invention at up to about 125° C. Examples of suitable tertiary amines include triethyl amine, tripropyl amine, triethylene diamine, diethyl ethanol amine, dimethyl ethanol amine and dimethyl isopropanol amine. Examples of suitable secondary amines include di-isopropyl amine and di-tert-butyl amine. Tertiary and secondary amines are available from Pennwalt (Atochem America), Air Products, B.A.S.F., and other manufacturers. Another example of this invention would utilize a combination of the foregoing compounds. The amine portion is present at a level of about 0.2 to about 4 moles of active amine nitrogen per mole of dicarboxylic acid. Preferably the amine portion is present at a level of about 0.5 to 2 moles of active amine nitrogen per mole of dicarboxylic acid.

The solute portion of the electrolyte also includes boric acid. Boric acid is available from U.S. Borax.

The boric acid is present in an amount sufficient to provide a molar ratio of uncomplexed borate ion to dicarboxylic acid of between about 0.1 and about 1.2. More preferably, the molar ratio of boric acid to dicarboxylic acid is about 0.15–0.65. Most preferably, when the dicarboxylic acid dodecanedioic acid is present at about 15%, boric acid would be present at the level of 0.66%. A preferred embodiment of this invention has boric acid present at 10 grams per mole of dicarboxylic acid when the amine is a non-alkanolamine and at 20 grams per mole of dicarboxylic acid when the amine is an alkanolamine.

In another embodiment, other additives commonly used in capacitor electrolytes may be present in minor amounts. In a preferred embodiment, p-nitrobenzoic acid is present at a level of about 0.04% to about 0.06%. Other examples of these additives include butyrolactone, nitro compounds and chlorine-complexing agents. Preferably, the content of these additives would not exceed 10%.

Preferably, the electrolyte will not include ethylene glycol or phosphorous compounds, i.e. compounds providing phosphate which can chemically interact with the electrodes. Experiments have shown that the presence of about 0.5% phosphate in an electrolyte which also includes ethylene glycol can limit the maximum voltage breakdown to about 240 volts. In contrast the electrolyte of the most preferred embodiment of this invention has a breakdown voltage of approximately 570 volts. While not wishing to be bound by any particular theory, it is believed that phosphate may attack the anodic oxide during electrification of the capacitor. In particular, electron microscopy of anodes from capacitors with phosphate and ethylene glycol in the electrolyte has shown that holes in the oxide coating begin to appear at about 180 volts. Such exposed areas appear to accelerate ethylene glycol breakdown and formation of corrosive products. It is believed that amounts of phosphate as low as 0.1% may impair efficiency of the capacitors of the present invention.

EXAMPLES

The following examples are provided by way of explanation and illustration. As such, they are not intended to limit the scope of the present invention as defined by the appended claims.

EXAMPLE 1

A liquid electrolyte was made according to the most preferred embodiment of the present invention. In particular, an electrolyte was made with the following composition (all numbers are percents by weight):

| | |
|---|---|
| N-methyl-2-pyrrolidone | 59.88% |
| Poly vinyl pyrrolidone K-30 | 9.90% |
| De-ionized water | 2.33% |
| Dodecanedioic acid | 15.32% |
| Boric acid | 0.66% |
| Diethyl ethanolamine | 11.64% |
| Tri-N-propylamine | 0.13% |
| P-nitrobenzoic acid | 0.05% |

TEST DATA FOR THE ELECTROLYTE OF EXAMPLE 1:

I. Electrolyte Stability Test

A set of sealed ration vials of the above formulation were placed in a 125° C. oven for up to 1,000 hours. At the stated time intervals, the vials were removed from the oven. After overnight equilibration at room temperature, pH and resistivity were determined.

Resistance measurements were as follows:

| RESISTANCE STABILITY AFTER 125° C. STORAGE | | | | | |
|---|---|---|---|---|---|
| | HOURS ON TEST: | | | | |
| | 0 | 75 | 250 | 500 | 1000 |
| Resistivity (Ω· cm/30° C.) | 3591 | 4201 | 4182 | 4052 | 4511 |
| Percent Change | | +17 | +16 | +12.8 | +25.6 |
| pH (at room temperature) | 8.48* | 9.03 | 9.02 | 8.86 | 8.58 |

*pH at 95° C. was initially 7.75.

As can be seen from the above measurements, the electrolyte is highly stable at 125° C.

II. Voltage Breakdown (VBD) Test

A 1-square inch sample of 99.99% pure, unanodized aluminum foil was centrally immersed in a 250-ml unstirred stainless steel beaker filled with test electrolyte at room temperature (25° C.) and 105° C. A constant D.C. bias current of 1 milliampere/cm² was applied until sparking was observed and/or the voltage rise versus time approached zero. The maximum voltage attained is reported as the voltage breakdown. The following data were determined for Example 1.

| Temperature (°C.): | 25 | 105 |
|---|---|---|
| VBD (Volts) | 585 | 530–570 |

EXAMPLE 2

An electrolyte liquid with the following formula was prepared as in Example 1.

| | |
|---|---|
| N-methyl-2-pyrrolidone | 68.82% |
| De-ionized water | 2.41% |
| Dodecanedioic acid | 15.84% |
| Diethyl ethanol amine | 12.04% |
| Tri-N-propyl amine | .138% |
| Boric acid | .69% |
| P-nitro benzoic acid | .051% |

The same tests as described above were conducted on the liquid of Example 2.
Resistivity = 2330 Ω .cm/30° C.
pH = 8.85/25° C.; 8.3/90° C.
VBD = 485 Volts/25° C.; 478 Volts/100° C.

| RESISTANCE STABILITY OF EXAMPLE 2 AFTER 125° C. STORAGE | | | | | |
|---|---|---|---|---|---|
| | HOURS ON TEST: | | | | |
| | 0 | 75 | 250 | 500 | 1000 |
| Resistivity (Ω· cm/30° C.) | 2330 | 2572 | 2594 | 2647 | 2693 |
| Percent Change | | +10.4% | +11.3% | +13.6% | +15.6% |
| pH (room | 8.85 | 8.92 | 8.87 | 9.00 | 8.83 |

-continued

RESISTANCE STABILITY OF EXAMPLE 2
AFTER 125° C. STORAGE

| HOURS ON TEST: | | | | |
|---|---|---|---|---|
| 0 | 75 | 250 | 500 | 1000 | temperature)

EXAMPLE 3

An electrolyte with the following formula was prepared as in Example 1.

| N-methyl-2-pyrrolidone | 78.26% |
|---|---|
| De-ionized water | 2.35% |
| Malic acid | 10.49% |
| Triethyl amine | 7.90% |
| Tri-N-propyl amine | .16% |
| Boric acid | .78% |
| P-nitrobenzoic acid | .059% |

The following test results were obtained with the above liquid electrolyte tested according to the methods described in Example 1.
Resistivity = 344 Ω .cm/30° C.
pH = 8.04/25° C.
VBD = 185 Volts/25° C.

EXAMPLE 4

An electrolyte with the following formula was prepared as in Example 1.

| N-methyl-2-pyrrolidone | 63.14% |
|---|---|
| Poly-vinyl-pyrrolidone K-30 | 10.52% |
| De-ionized water | 2.10% |
| Di-isopropyl amine | 7.19% |
| Tri-N-propyl amine | .14% |
| Dodecanedioic acid | 16.15% |
| Boric acid | .70% |
| P-nitrobenzoic acid | .05% |

The following test results were obtained with the above liquid electrolyte tested according to the methods described in Example 1.
Resistivity = 2963 Ω.cm/30° C.
pH = 9.2/25° C.
VBD = 560 Volts/25° C.; 536 Volts/105° C.

EXAMPLE 5

An electrolyte with the following formula was prepared as in Example 1.

| N-methyl-2-pyrrolidone | 63.14% |
|---|---|
| Poly vinyl pyrrolidone K-30 | 10.52% |
| Water | 2.10% |
| Dodecanedioic acid | 16.15% |
| Boric acid | .70% |
| Triethyl amine | 7.90% |
| Tripropyl amine | .14% |
| P-nitrobenzoic acid | .05% |

The following test results were obtained with the above liquid electrolyte tested according to the methods described in Example 1.
Resistivity, 30° C. = 2630 Ω .CM
pH = 8.76
VBD = 580-590 Volts/20° C.; 550 Volts/100° C.

EXAMPLE 6

An electrolyte with the following formula was prepared as in Example 1.

| N-methyl-2-pyrrolidine | 72.78% |
|---|---|
| Water | 2.18% |
| Dodecanedioic acid | 16.75% |
| Boric acid | .73% |
| Triethyl amine | 7.35% |
| Tripropyl amine | .14% |
| P-nitrobenzoic acid | .05% |

The following test results were obtained with the above liquid electrolyte tested according to the methods described in Example 1.
Resistivity, 30° C. = 1623 Ω .CM
pH = 9.48
VBD = 485 Volts/20° C.; 482 Volts/100° C.

EXAMPLE 7

An electrolyte with the following formula was prepared as in Example 1.

| N-methyl-2-pyrrolidone | 68.85% |
|---|---|
| Poly vinyl pyrrolidone K-30 | 11.47% |
| Water | 2.29% |
| Azelaic acid | 10.79% |
| Boric acid | .76% |
| Triethyl amine | 5.81% |
| Tripropyl amine | .15% |
| P-Nitrobenzoic acid | .06% |

The following test results were obtained with the above liquid electrolyte tested according to the methods described in Example 1.
Resistivity, 30° C. = 2460 Ω .CM
pH = 8.74
VBD = 572 Volts/20° C.

EXAMPLE 8

An electrolyte with the following formula was prepared as in Example 1.

| N-cyclohexyl-2-pyrrolidone | 56.14% |
|---|---|
| N-methyl-2-pyrrolidone | 7.02% |
| Poly vinyl pyrrolidone K-30 | 10.53% |
| Water | 2.11% |
| Dodecanedioic acid | 16.15% |
| Boric acid | .70% |
| Triethyl amine | 7.16% |
| Tripropyl amine | .14% |
| P-Nitrobenzoic acid | .05% |

The following test results were obtained with the above liquid electrolyte tested according to the methods described in Example 1.
Resistivity, 30° C. = 16,000 Ω .CM
VBD = 674 Volts/20° C.

EXAMPLE 9

An electrolyte with the following formula was prepared as in Example 1.

| N-methyl-2-pyrrolidone | 61.68% |
|---|---|
| De-ionized water | 2.15% |
| Dodecanedioic acid | 28.40% |
| Boric acid | 1.23% |
| Tri-N-propyl amine | .139% |

| | |
|---|---|
| Dimethyl isopropanol amine | 6.35% |
| P-nitrobenzoic acid | .0462% |

The following test results were obtained with the above liquid electrolyte tested according to the methods described in Example 1.

Resistivity = 2200 Ω .cm/30° C.
pH = 8.0/25° C.
VBD = 499 Volts/25° C.; 485 Volts/105° C.

THERMAL STABILITY DATA

For the liquid electrolytes of Examples 3 through 7, chemical stability was evaluated. The electrolytes were placed in sealed reaction vials. Initially pH and resistivity were determined at 30° C. The vials were stored at either 85° or 125° C. for 1000 hours. The vials were then allowed to equilibrate overnight at room temperature. pH and resistivity were again determined at 30° C. Initial and final pH and resisitivity are shown in the following table. The percents of change in resistivity between final and initial values calculated are also shown.

| EXAMPLE | | INITIAL | 85° C. | 125° C. |
|---|---|---|---|---|
| 3 | pH: | 8.04 | 8.05 | 8.16 |
| | Resistivity: | 344Ω·cm | 332Ω·cm | 336Ω·cm |
| | % ΔResistivity: | | −3.5% | −2.2% |
| 4 | pH: | 9.2 | 9.18 | 9.20 |
| | Resistivity: | 2963Ω·cm | 2983Ω·cm | 3083Ω·cm |
| | % ΔResistivity: | | +0.7% | +3.4% |
| 5 | pH: | 8.76 | 8.87 | 8.90 |
| | Resistivity: | 2630Ω·cm | 2594Ω·cm | 2792Ω·cm |
| | % ΔResistivity: | | −1.4% | +6.2% |
| 6 | pH: | 9.48 | 9.42 | 9.49 |
| | Resistivity: | 1623Ω·cm | 1665Ω·cm | 1721Ω·cm |
| | % ΔResistivity | | +2.6% | +6.1% |
| 7 | pH: | 8.74 | 8.89 | — |
| | Resistivity: | 2460Ω·cm | 2580Ω·cm | 2818Ω·cm |
| | % ΔResistivity: | | +4.8% | +14.5% |

LIFE TEST DATA

Life test data were obtained for the formulation of Example 5 at three temperatures (65°, 85° and 105° C.), and for two different capacitances (13 and 2000 microfarads).

The life test study began by first determining baseline parameters at room temperature, including capacitance (CAP), equivalent series resistance (ESR) and direct current leakage (DCL). Test samples were then connected to power supplies which delivered the voltages indicated in the following tables. All samples were maintained in constant-temperature ovens for the temperatures and durations indicated in the following tables. When the duration expired, the samples were removed from the oven, disconnected from the power source and permitted to equilibrate at room temperature overnight. The same parameters (CAP, ESR and DCL) were again determined at room temperature.

Average changes in CAP, ESR and DCL were calculated. The slight decrease in CAP (only 3% after 2000 hours at 105° C.) and the modest rise in ESR (only 20% at 105° C. and less at other temperatures) indicate only a slight decrease in capacitor performance under adverse conditions.

Nine electrolytic capacitors rated at 2000 MFD were impregnated with the liquid electrolyte of Example 5. After initial measurements, the capacitors were stored under the following conditions: 550 volts applied, at 65° C. for 1300 hours.

| LIFE TEST DATA* FOR EXAMPLE 5 AT 65° C. | | | | | | |
|---|---|---|---|---|---|---|
| | INITIAL | | | 1300 HR. | | |
| UNIT | 120 Hz CAP | ESR | DCL | 120 Hz CAP | ESR | DCL |
| 1 | 1886.6 | .144 | .998 | 1863.2 | .155 | .623 |
| 2 | 1947.6 | .110 | .844 | 1928.2 | .125 | .588 |
| 3 | 1844.1 | .142 | .890 | 1833.4 | .148 | .487 |
| 4 | 1915.4 | .130 | .936 | 1897.5 | .140 | .535 |
| 5 | 1936.8 | .122 | .991 | 1916.2 | .135 | .612 |
| 6 | 1895.8 | .126 | .949 | 1859.8 | .129 | 1.08 |
| 7 | 1940.5 | .125 | .916 | 1906.7 | .119 | .921 |
| 8 | 1861.7 | .156 | .940 | 1839.5 | .128 | .985 |
| 9 | 1884.8 | .160 | .898 | 1865.8 | .139 | .789 |
| Mean | 1901.5 | .135 | .929 | 1878.9 | .135 | .736 |

Changes:
CAP = −1.2%
ESR = +0.2%
DCL = −21%
*Capacitance (CAP) is given in microfarads, equivalent series resistance (ESR) is given in ohms, and direct current leakage (DCL) is given in milliamperes.

Six capacitors rated at 2000 MFD were impregnated with the liquid electrolyte of Example 5. After initial measurements, the capacitors were stored at 85° C. for 2000 hours while 500 volts were continuously applied.

| LIFE TEST DATA* FOR EXAMPLE 5 AT 85° C. | | | | | | |
|---|---|---|---|---|---|---|
| | INITIAL | | | 1300 HR. | | |
| UNIT | 120 Hz CAP | ESR | DCL | 120 Hz CAP | ESR | DCL |
| 1 | 2119.5 | .0796 | 1.51 | 2080.3 | .081 | .289 |
| 2 | 2046.7 | .0813 | 3.11 | 1989.7 | .088 | .381 |
| 3 | 2158.8 | .0774 | 1.41 | 2120.3 | .086 | .295 |
| 4 | 2118.3 | .0817 | 1.84 | 2084.4 | .082 | .308 |
| 5 | 2026.3 | .0786 | 1.76 | 2000.0 | .082 | .217 |
| 6 | 2101.5 | .0797 | 1.40 | 2067.4 | .082 | .272 |
| Mean | 2095.2 | 0797 | 1.84 | 2057.0 | .084 | .294 |

Changes:
CAP = −1.8%
ESR = +4.7%
DCL = −84%
*Capacitance (CAP) is given in microfarads, equivalent series resistance (ESR) is given in ohms, and direct current leakage (DCL) is given in milliamperes.

Five capacitors rated at 13 MFD were impregnated with the liquid electrolyte of Example 5. After initial measurements, the capacitors were stored at 105° C. for 2000 hours while 500 volts were continuously applied.

| LIFE TEST DATA* FOR EXAMPLE 5 AT 105° C. | | | | | | |
|---|---|---|---|---|---|---|
| | INITIAL | | | 1300 HR. | | |
| UNIT | 120 Hz CAP | ESR | DCL | 120 Hz CAP | ESR | DCL |
| 1 | 13.33 | 6.99 | .010 | 12.85 | 8.63 | .001 |
| 2 | 14.09 | 7.10 | .209 | 13.63 | 7.52 | .001 |
| 3 | 13.87 | 6.55 | .010 | 13.46 | 9.49 | .002 |
| 4 | 13.66 | 6.60 | .007 | 13.28 | 7.45 | .001 |
| 5 | 13.55 | 6.94 | .007 | 13.19 | 7.92 | .001 |
| Mean | 13.70 | 6.84 | .049 | 13.28 | 8.20 | .001 |

Changes:
CAP = −3.1%
ESR = +20%
DCL = −97.5%
*Capacitance (CAP) is given in microfarads, equivalent series resistance (ESR) is given in ohms, and direct current leakage (DCL) is given in milliamperes.

SHELF LIFE TEST DATA

In order to demonstrate the non-corrosive nature of this electrolyte system under adverse shelf life storage conditions (i.e., extended storage, elevated temperature, and no voltage applied), two capacitors rated at 5500 MFD were impregnated with the liquid electrolyte of Example 6. After initial measurements, the capacitors were stored at 85° C. for 1500 hours with no applied voltage.

| SHELF LIFE TEST* DATA FOR EXAMPLE 6 AT 85° C. | | | | | | |
|---|---|---|---|---|---|---|
| | INITIAL | | | 1300 HR. | | |
| UNIT | 120 Hz CAP | ESR | DCL | 120 Hz CAP | ESR | DCL |
| 1 | 5212.0 | .032 | 1.13 | 5126 | .027 | 4.64 |
| 2 | 5175.0 | .033 | 1.27 | 5079 | .029 | 4.27 |
| Mean | 5193.5 | .033 | 1.20 | 5079 | .028 | 4.46 |

Changes:
CAP = −1.8%
ESR = −15%
DCL = +270%
*Capacitance (CAP) is given in microfarads, equivalent series resistance (ESR) is given in ohms, and direct current leakage (DCL) is given in milliamperes.

ADDITIONAL VOLTAGE BREAKDOWN TESTING

An additional voltage breakdown test was performed on the electrolyte of Examples 1 and 8 with the following two changes: 1) Instead of the usual unanodized foil, Becromal Alpha 840 foil anodized to 800 volts was employed; and 2) the current density was reduced from 1 milliampere/$cm^2$ to 0.1 milliampere. For the test, one-inch squares of the anodized foil were cut with ceramic scissors. These squares were centrally immersed in stainless steel beakers containing 250 ml of the test liquid electrolyte, which was unstirred during the test. By this additional test, the result for Example 1 was a VBD of 640 volts and for Example 8 it was 736 volts.

A novel capacitor and capacitor electrolyte which has surprisingly high stability over a wide range of temperatures has been described above. It is evident that those skilled in the art may now make many uses and modifications of the specific embodiments described, without departing from the inventive concepts. The invention is to be construed as embracing each and every novel feature and novel combination of features present in the electrolyte and capacitor as defined by the appended claims.

We claim:

1. A liquid electrolyte for an electrolytic capacitor comprising:
    (a) a solvent portion comprising
        (i) one or more N-substituted pyrrolidones in the amount of at least 40% by weight of the liquid electrolyte; and
        (ii) water in the range of about 0.2 to about 8% by weigh of the liquid electrolyte;
    (b) a solute portion comprising
        (i) an amine salt, comprising an acid portion and an amine portion,
            (A) said acid portion comprising a dicarboxylic acid with 6 to 40 carbons and present at a level of about 0.1 to 4 moles per kilogram of solvent, and
            (B) said amine portion being selected from the group consisting of tertiary amines and relatively nonreactive secondary amines and present at a level of about 0.2 to 4 moles of active amine nitrogen per mole of dicarboxylic acid; and
        (ii) boric acid in an amount sufficient to provide a molar ratio of uncomplexed borate ion to dicarboxylic acid of between about 0.1 and about 1.2; and
    (c) less than about 0.5% phosphate.

2. The liquid electrolyte of claim 1, wherein said pyrrolidone is selected from the group consisting of N-methyl-2-pyrrolidone, N-ethyl-2-pyrrolidone, N-cyclohexyl-2-pyrrolidone, and combinations thereof.

3. The liquid electrolyte of claim 1, wherein at least a portion of the pyrrolidone comprises a polymer of substituted pyrrolidone.

4. The liquid electrolyte of claim 3, wherein the polymer of substituted pyrrolidone is poly vinyl pyrrolidone.

5. The liquid electrolyte of claim 3, wherein said polymer of substituted pyrrolidone comprises between about 5 and about 35% of the liquid electrolyte.

6. The liquid electrolyte of claim 3, wherein said polymer of substituted pyrrolidone comprises between about 8 and 12% of the liquid electrolyte.

7. The liquid electrolyte of claim 1, wherein said water content is present in an amount between about 2 and about 3% of the liquid electrolyte.

8. The liquid electrolyte of claim 1, wherein said dicarboxylic acid has 8 to 12 carbon atoms.

9. The liquid electrolyte of claim 1, wherein said dicarboxylic acid is present at a level of about 1 mole per kilogram of solvent.

10. The liquid electrolyte of claim 1, wherein said dicarboxylic acid is selected from a group consisting of adipic acid, azelaic acid, dodecanedioic acid, sebacic acid, 5(6)-carboxy-4-hexyl-2-cyclohexene-1-octanoic acid, naphthalene dicarboxylic acid, 4,4'-oxybis (benzoic acid), and mixtures thereof.

11. The liquid electrolyte of claim 1, wherein said dicarboxylic acid is comprised of 36-carbon acids formed by dimerization of the unsaturated 18-carbon acids of "tall oil."

12. The liquid electrolyte of claim 1, wherein said amine portion is a tertiary amine selected from the group consisting of triethyl amine, tripropyl amine, triethylene diamine, diethyl ethanol amine, dimethyl ethanol amine and dimethyl isopropanol amine.

13. The liquid electrolyte of claim 1, wherein said amine portion is a secondary amine selected from the group consisting of di-isopropyl amine and di-tert-butyl amine.

14. The liquid electrolyte of claim 1, wherein said molar ratio of boric acid to dicarboxylic acid is about 0.16.

15. The liquid electrolyte of claim 1, wherein the amine is an alkanolamine and said molar ratio of boric acid to dicarboxylic acid is about 0.32.

16. A liquid electrolyte for an electrolytic capacitor comprising:
    (a) a solvent portion comprising
        (i) one or more N-substituted pyrrolidone monomers in the range of about 30–80% by weight of the liquid electrolyte and polyvinyl pyrrolidone in the range of about 8–12% by weight of the liquid electrolyte; and
        (ii) water in the range of about 2 to about 3% by weight of the liquid electrolyte;
    (b) a solute portion comprising
        (i) an amine salt, comprising an acid portion and an amine portion, (A) said acid portion comprising a dicarboxylic acid with 8 to 12 carbons and present at a level of about 0.5 to 2 moles per kilogram of solvent, and (B) said amine portion being selected from the group consisting of tertiary amines and relatively nonreactive secondary amines and preset at a level of about 0.5 to 2 moles of active amine nitrogen per mole of dicarboxylic acid; and (ii) boric acid in an amount sufficient to provide a molar ratio of uncomplexed borate ion to dicarboxylic acid of between about 0.1 and about 0.65; and (c) less than about 0.5% phosphate.

17. The liquid electrolyte of claim 16, wherein said pyrrolidone monomer is selected from the group consisting of N-methyl-2-pyrrolidone, N-ethyl-2-pyrrolidone, N-cyclohexyl-2-pyrrolidone, and combinations thereof.

18. The liquid electrolyte of claim 16, wherein said dicarboxylic acid is present at a level of about 1 mole per kilogram of solvent.

19. The liquid electrolyte of claim 16, wherein said dicarboxylic acid is selected from the group consisting of azelaic acid, dodecanedioic acid, sebacic acid, and mixtures thereof.

20. The liquid electrolyte of claim 16, wherein said amine portion is a tertiary amine selected from the group consisting of triethyl amine, tripropyl amine, triethylene diamine, diethyl ethanol amine, dimethyl ethanol amine and dimethyl isopropanol amine.

21. The liquid electrolyte of claim 16, wherein said amine portion is a secondary amine selected from the group consisting of di-isopropyl amine and di-tert-butyl amine.

22. The liquid electrolyte of claim 16, wherein said molar ratio of boric acid to dicarboxylic acid is about 0.16.

23. The liquid electrolyte of claim 16, wherein the amine is an alkanolamine and said molar ratio of boric acid to dicarboxylic acid is about 0.32.

24. An electrolytic capacitor comprising a pair of electrodes, at least one of which is composed of a film forming metal and an electrolyte according to claim 1, 2, 3, 4, 5, 6, 7, 8, 9, 10, 11, 12, 13, 14, 15, 16, 17, 18, 19, 20, 21, 22, or 23.

* * * * *